(12) United States Patent
King et al.

(10) Patent No.: US 9,313,349 B2
(45) Date of Patent: *Apr. 12, 2016

(54) OPTICAL SCANNERS, SUCH AS HAND-HELD OPTICAL SCANNERS

(71) Applicant: Google Inc., Mountain View, CA (US)

(72) Inventors: Martin T. King, Vashon Island, WA (US); Claes-Fredrik Mannby, Issaquah, WA (US); Thomas C. Arends, Bellevue, WA (US); David P. Bajorins, Bothell, WA (US); Daniel C. Fox, Duvall, WA (US)

(73) Assignee: Google Inc., Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/965,099

(22) Filed: Aug. 12, 2013

(65) Prior Publication Data

US 2015/0172489 A1    Jun. 18, 2015

Related U.S. Application Data

(63) Continuation of application No. 12/831,213, filed on Jul. 6, 2010, now Pat. No. 8,600,196, which is a continuation of application No. 12/517,352, filed as application No. PCT/EP2007/007824 on Sep. 7, 2007, now abandoned.

(60) Provisional application No. 60/843,362, filed on Sep. 8, 2006, provisional application No. 60/844,894, filed on Sep. 15, 2006, provisional application No. 60/845,604, filed on Sep. 18, 2006.

(51) Int. Cl.
*H04N 1/00* (2006.01)
*G06Q 30/00* (2012.01)
*H04N 1/028* (2006.01)

(52) U.S. Cl.
CPC ........... *H04N 1/00525* (2013.01); *G06Q 30/00* (2013.01); *H04N 1/00331* (2013.01); *H04N 1/0282* (2013.01); *H04N 1/02815* (2013.01)

(58) Field of Classification Search
None
See application file for complete search history.

(56) References Cited

U.S. PATENT DOCUMENTS

| | | | | |
|---|---|---|---|---|
| 4,135,791 A | * | 1/1979 | Govignon | 351/206 |
| 4,955,693 A | * | 9/1990 | Bobba | 359/894 |
| 5,602,376 A | * | 2/1997 | Coleman et al. | 235/462.44 |
| 5,818,612 A | * | 10/1998 | Segawa et al. | 358/494 |
| 6,033,086 A | * | 3/2000 | Bohn | 362/235 |
| 6,360,949 B1 | * | 3/2002 | Shepard et al. | 235/462.43 |
| 7,561,312 B1 | * | 7/2009 | Proudfoot et al. | 358/475 |
| 8,600,196 B2 | * | 12/2013 | King et al. | 382/313 |
| 2002/0125411 A1 | * | 9/2002 | Christy | 250/225 |
| 2002/0169509 A1 | * | 11/2002 | Huang et al. | 700/66 |
| 2003/0039411 A1 | * | 2/2003 | Nada | 382/313 |
| 2004/0028295 A1 | * | 2/2004 | Allen et al. | 382/313 |
| 2005/0205671 A1 | * | 9/2005 | Gelsomini et al. | 235/384 |
| 2005/0243386 A1 | * | 11/2005 | Sheng | 358/506 |
| 2005/0270358 A1 | * | 12/2005 | Kuchen et al. | 347/130 |
| 2006/0103893 A1 | * | 5/2006 | Azimi et al. | 358/474 |
| 2006/0266839 A1 | * | 11/2006 | Yavid et al. | 235/462.45 |

(Continued)

FOREIGN PATENT DOCUMENTS

JP    10200804 A  *  7/1998

*Primary Examiner* — Jon Chang
(74) *Attorney, Agent, or Firm* — Fish & Richardson P.C.

(57) ABSTRACT

A hand-held optical scanner is described. The hand-held optical scanner has an image sensor, as well as a scan window through which image light is directed toward the image sensor.

15 Claims, 11 Drawing Sheets

(56) References Cited

U.S. PATENT DOCUMENTS

| | | | |
|---|---|---|---|
| 2006/0283952 A1* | 12/2006 | Wang | 235/462.01 |
| 2007/0194119 A1* | 8/2007 | Vinogradov et al. | 235/454 |
| 2007/0228306 A1* | 10/2007 | Gannon et al. | 250/555 |
| 2008/0023550 A1* | 1/2008 | Yu et al. | 235/462.32 |
| 2009/0059316 A1* | 3/2009 | Irwin et al. | 358/474 |
| 2011/0228349 A1* | 9/2011 | Iwayama et al. | 358/474 |
| 2012/0170083 A1* | 7/2012 | Joh | 358/475 |
| 2013/0128322 A1* | 5/2013 | Joh et al. | 358/475 |

* cited by examiner

FIG. 1A  FIG. 1B  FIG. 1C

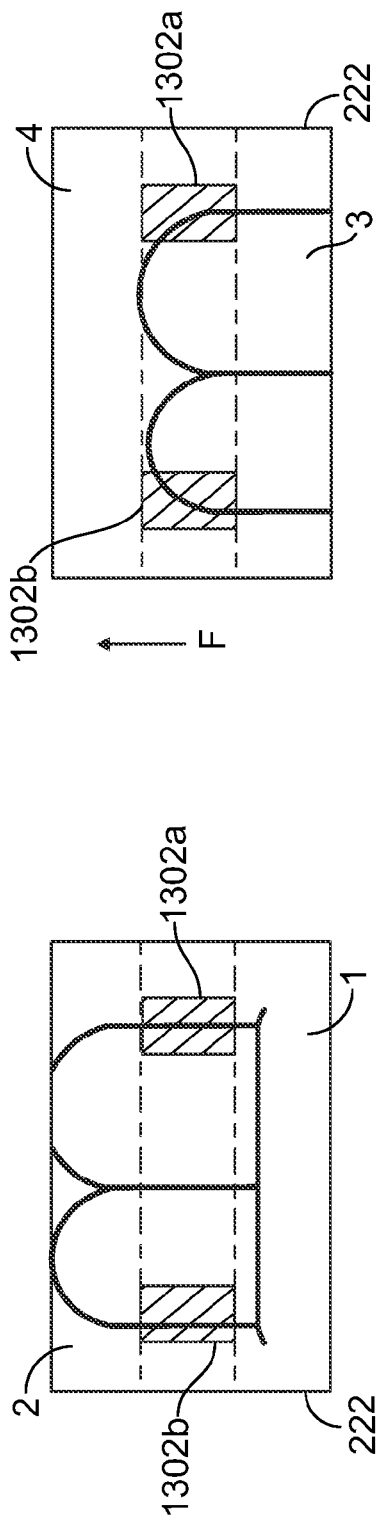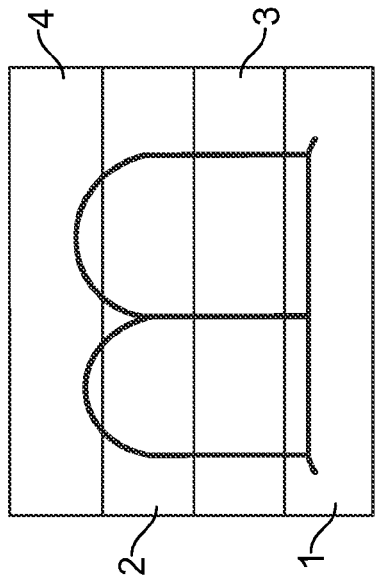
FIG. 13A
FIG. 13B
FIG. 14

OPTICAL SCANNERS, SUCH AS HAND-HELD OPTICAL SCANNERS

CROSS-REFERENCE TO RELATED APPLICATIONS

This application is a continuation of U.S. patent application Ser. No. 12/831,213 filed on Jul. 6, 2010, which is a continuation of U.S. patent application Ser. No. 12/517,352 filed on Jun. 2, 2009, which is a National Stage Entry of International Application No. PCT/EP2007/007824 filed on Sep. 7, 2009. International Application No. PCT/EP/2007/007824 claims priority to the following U.S. Provisional Patent Applications, each of which is hereby incorporated in its entirety: U.S. Provisional Patent Application No. 60/843,362 filed on Sep. 8, 2006, entitled OPTICAL SCANNERS, SUCH AS HAND-HELD OPTICAL SCANNERS, U.S. Provisional Patent Application No. 60/844,894 filed on Sep. 15, 2006, entitled OPTICAL SCANNERS, SUCH AS HAND-HELD OPTICAL SCANNERS, and U.S. Provisional Patent Application No. 60/845,604 filed on Sep. 18, 2006, entitled OPTICAL SCANNERS, SUCH AS HAND-HELD OPTICAL SCANNERS.

This application is also related to the following U.S. patent applications, each of which is hereby incorporated by reference in its entirety: U.S. patent application Ser. No. 11/004,637 filed on Dec. 3, 2004, U.S. patent application Ser. No. 11/097,103, filed on Apr. 1, 2005, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/097,961, filed Apr. 1, 2005, entitled METHODS AND SYSTEMS FOR INITIATING APPLICATION PROCESSES BY DATA CAPTURE FROM RENDERED DOCUMENTS, U.S. patent application Ser. No. 11/097,093, filed Apr. 1, 2005, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed Apr. 1, 2005, entitled CONTENT ACCESS WITH HANDHELD DOCUMENT DATA CAPTURE DEVICES, U.S. patent application Ser. No. 11/098,014, filed Apr. 1, 2005, entitled SEARCH ENGINES AND SYSTEMS WITH HANDHELD DOCUMENT DATA CAPTURE DEVICES, U.S. patent application Ser. No. 11/098,043, filed Apr. 1, 2005, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed Apr. 1, 2005, entitled INFORMATION GATHERING SYSTEM AND METHOD, U.S. patent application Ser. No. 11/097,089, filed Apr. 1, 2005, entitled DOCUMENT ENHANCEMENT SYSTEM AND METHOD, U.S. patent application Ser. No. 11/097,835, filed Apr. 1, 2005, entitled PUBLISHING TECHNIQUES FOR ADDING VALUE TO A RENDERED DOCUMENT, U.S. patent application Ser. No. 11/098,016, filed Apr. 1, 2005, entitled ARCHIVE OF TEXT CAPTURES FROM RENDERED DOCUMENTS, U.S. patent application Ser. No. 11/097,828, filed Apr. 1, 2005, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed Apr. 1, 2005, entitled ESTABLISHING AN INTERACTIVE ENVIRONMENT FOR RENDERED DOCUMENTS, U.S. patent application Ser. No. 11/098,042, filed Apr. 1, 2005, entitled DATA CAPTURE FROM RENDERED DOCUMENTS USING HANDHELD DEVICE, U.S. patent application Ser. No. 11/096,704, filed Apr. 1, 2005, entitled CAPTURING TEXT FROM RENDERED DOCUMENTS USING SUPPLEMENTAL INFORMATION, U.S. patent application Ser. No. 11/110,353, filed Apr. 19, 2005, entitled PROCESSING TECHNIQUES FOR VISUAL CAPTURE DATA FROM A RENDERED DOCUMENT, U.S. patent application Ser. No. 11/131,945, filed May 17, 2005, entitled PROCESSING TECHNIQUES FOR TEXT CAPTURE FROM A RENDERED DOCUMENT, U.S. patent application Ser. No. 11/185,908, filed Jul. 19, 2005, entitled AUTOMATIC MODIFICATION OF WEB PAGES, U.S. patent application Ser. No. 11/208,408, filed Aug. 18, 2005, entitled SCANNER HAVING CONNECTED AND UNCONNECTED OPERATIONAL BEHAVIORS, U.S. patent application Ser. No. 11/208,457, filed Aug. 18, 2005, entitled LOCATING ELECTRONIC INSTANCES OF DOCUMENTS BASED ON RENDERED INSTANCES, DOCUMENT FRAGMENT DIGEST GENERATION, AND DIGEST BASED DOCUMENT FRAGMENT DETERMINATION, U.S. patent application Ser. No. 11/208,458, filed Aug. 18, 2005, entitled METHODS, SYSTEMS AND COMPUTER PROGRAM PRODUCTS FOR DATA GATHERING IN A DIGITAL AND HARD COPY DOCUMENT ENVIRONMENT, U.S. patent application Ser. No. 11/208,461, filed Aug. 18, 2005, entitled APPLYING SCANNED INFORMATION TO IDENTIFY CONTENT, U.S. patent application Ser. No. 11/209,333, filed Aug. 23, 2005, entitled A PORTABLE SCANNING DEVICE, U.S. patent application Ser. No. 11/210,260, filed Aug. 23, 2005, entitled A METHOD AND SYSTEM FOR CHARACTER RECOGNITION, U.S. patent application Ser. No. 11/236,440, filed Sep. 27, 2005, entitled SECURE DATA GATHERING FROM RENDERED DOCUMENTS, U.S. patent application Ser. No. 11/236,330, filed Sep. 27, 2005, entitled HANDHELD DEVICE FOR CAPTURING TEXT FROM BOTH A DOCUMENT PRINTED ON PAPER AND A DOCUMENT DISPLAYED ON A DYNAMIC DISPLAY DEVICE, U.S. patent application Ser. No. 11/365,983, filed Feb. 28, 2006, entitled ASSOCIATION OF A PORTABLE SCANNER WITH INPUT/OUTPUT AND STORAGE DEVICES, U.S. patent application Ser. No. 11/432,731, filed May 11, 2006, entitled A PORTABLE SCANNING AND MEMORY DEVICE, International Patent Application No. PCT/US05/11533, filed Apr. 1, 2005, entitled A SYSTEM AND METHOD FOR CHARACTER RECOGNITION, International Patent Application No. PCT/US05/13586, filed Apr. 6, 2005, entitled SCANNING APPARATUS AND RELATED TECHNIQUES, International Patent Application No. PCT/US05/12510, filed Apr. 12, 2005, entitled ADDING VALUE TO A RENDERED DOCUMENT.

This application is further related to the following U.S. Provisional Patent Applications, each of which is hereby incorporated by reference in its entirety: Application No. 60/559,226 filed on Apr. 1, 2004, Application No. 60/558,893 filed on Apr. 1, 2004, Application No. 60/558,968 filed on Apr. 1, 2004, Application No. 60/558,867 filed on Apr. 1, 2004, Application No. 60/559,278 filed on Apr. 1, 2004, Application No. 60/559,279 filed on Apr. 1, 2004, Application No. 60/559,265 filed on Apr. 1, 2004, Application No. 60/559,277 filed on Apr. 1, 2004, Application No. 60/558,969 filed on Apr. 1, 2004, Application No. 60/558,892 filed on Apr. 1, 2004, Application No. 60/558,760 filed on Apr. 1, 2004, Application No. 60/558,717 filed on Apr. 1, 2004, Application No. 60/558,499 filed on Apr. 1, 2004, Application No. 60/558,370 filed on Apr. 1, 2004, Application No. 60/558,789 filed on Apr. 1, 2004, Application No. 60/558,791 filed on Apr. 1, 2004, Application No. 60/558,527 filed on Apr. 1, 2004, Application No. 60/559,125 filed on Apr. 2, 2004, Application No. 60/558,909 filed on Apr. 2, 2004, Application No. 60/559,033 filed on Apr. 2, 2004, Application No. 60/559,127 filed on Apr. 2, 2004, Application No. 60/559,087 filed on Apr. 2, 2004, Application No. 60/559,131 filed on Apr. 2, 2004, Application No. 60/559,766 filed on Apr. 6, 2004, Application No. 60/561,768 filed on Apr. 12, 2004, Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667, filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004, Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005; Application No. 60/811,623, filed Jun. 6, 2006 and 60/833,131, filed Jul. 24, 2006.

TECHNICAL FIELD

The following disclosure relates generally to optical scanning devices and related systems.

BACKGROUND

Optical scanning devices digitize images and text and translate the information into a machine-readable form a computer can use. The image data can then be used in a number of different ways. For example, the data can be used by a personal computer to reproduce an image of the scanned object on a display device or a printer. The data can also be used by a computer to find and retrieve an electronic version of all or a portion of the original document or source.

There are numerous types of optical scanners, including both fixed scanners (e.g., conventional copy machines) and portable scanners (e.g., hand-held scanning devices). As the name implies, a hand-held optical scanner can be held in a user's hand and moved over the text or image the user desires to scan. The image data can then be stored in scanner memory for later download, or downloaded directly to an associated computer or other processing device via a cable or wireless connection.

BRIEF DESCRIPTION OF THE DRAWINGS

FIGS. 1A-1D are top, side, bottom, and end views, respectively, of a configuration of a hand-held optical scanner.

FIGS. 13A and 13B are schematic diagrams of sequential scan images illustrating various stages in a method of image processing.

FIG. 14 is a schematic diagram of a processed image composed of portions of the scan images illustrated in FIGS. 13A and 13B.

DETAILED DESCRIPTION

The following disclosure describes various embodiments of optical scanners, such as hand-held optical scanners, and related features. For example, many of the scanner configurations described below can include transparent or translucent scan windows through which internal light sources (e.g., LEDs) illuminate a scan region. Various features are also described below to minimize or reduce specular reflection of light off the scan window, as this could adversely affect the scan image. These features can include partial light shields, sequential lighting/image processing, diffuse light sources, polarizing filters, etc.

Other scanner configurations described below can include scan windows which have contoured or shaped surfaces to magnify or reduce the scan image, thereby altering the field of view or otherwise enhancing the imaging characteristics of the scanner. Still other scanner configurations described below can include a first image sensor positioned toward one end of the scanner and a second image sensor positioned toward one side of the scanner. In one scanner configuration, for example, the first image sensor can be a two-dimensional image sensor for capturing a particular set of markings (e.g., a particular sentence), and the second image sensor can be a one-dimensional image sensor for capturing a broader portion of markings (e.g., a full paragraph or page of text) in a single pass of the scanner.

Certain details are set forth in the following description to provide a thorough understanding of the different embodiments of the invention. However, other details describing well-known features, systems and methods often associated with optical scanners and related processing systems are not set forth below, to avoid unnecessarily obscuring the description of the various embodiments.

Many of the details, dimensions, angles and other features shown in the Figures are merely illustrative of particular embodiments described herein. Accordingly, other embodiments can have other details, dimensions, angles and features without departing from the scope of the present disclosure. Furthermore, additional embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1D:
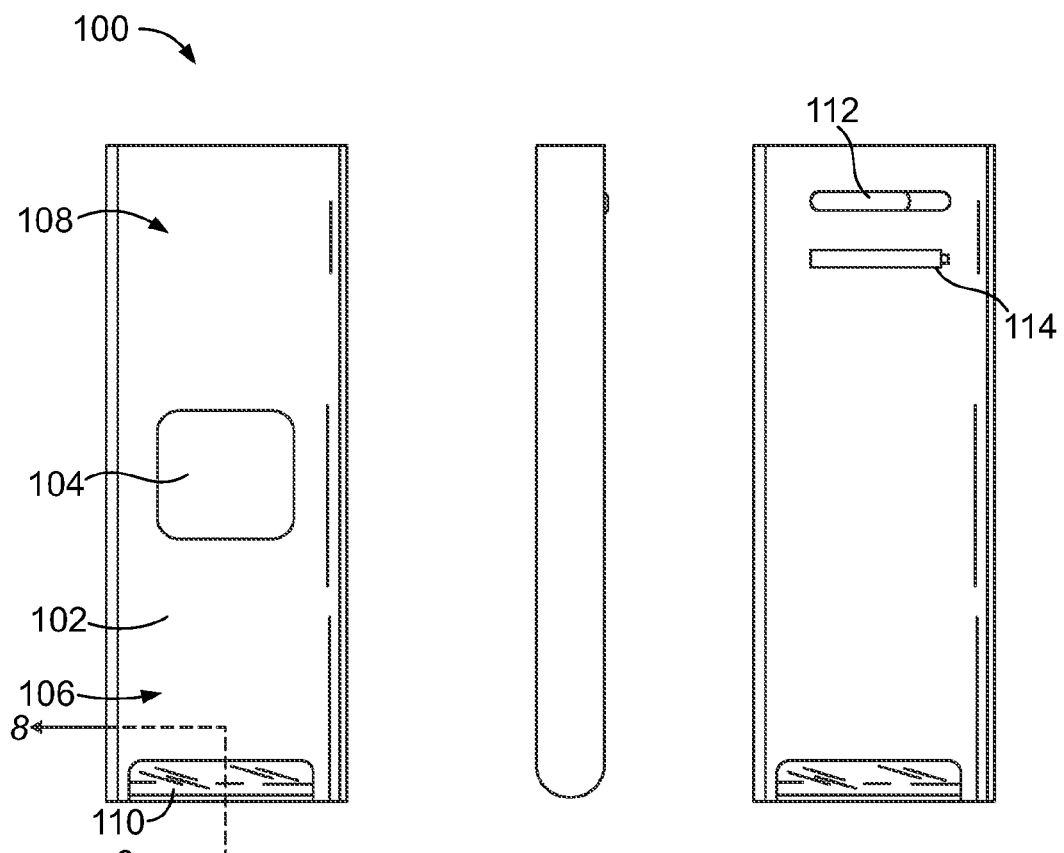
Figure 1D:
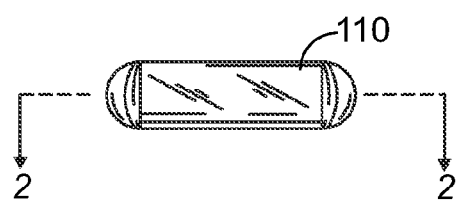

FIGS. 1A-1D are related top, side, bottom, and end views, respectively, of a hand-held optical scanner 100. Referring first to FIG. 1A, the hand-held optical scanner 100 ("scanner 100") includes a durable body 102 suitable for single-handed operation by a user (not shown). The body 102 can be formed from, e.g., aluminum, plastic, and/or other suitable materials. The scanner 100 also includes an operating button 104 conveniently disposed in a mid-portion of the body 102, and a transparent or translucent scan window 110 disposed toward an end portion of the body 102. The scan window 110 can be produced from a number of different materials, including various types of plastic, glass, and/or other materials known in the art that are suitably transparent or translucent.

In the illustrated embodiment, the top surface of the scanner 100 includes a scan diagnostics area 106 and a text area 108. The scan diagnostics area 106 can include various types of lights and/or other features to indicate the mode of operation or status of the scanner. For example, the scan diagnostics area 106 can include a light (e.g., a red light) that illuminates to indicate that scanning has begun. Additionally, such a light can be aligned with the scan window 110 to help the user center the scanner 100 over the text or other image he or she wishes to scan. In another aspect of this particular embodiment, the light on the scan diagnostics area can be illuminated in a different color (for example, green) to indicate that a scanned document has been identified.

The text area 108 can include, for example, an organic light emitting diode (OLED) for providing textual information about the operation of the scanner 100. For example, in one embodiment, the text area 108 can illuminate a "scanning" text message once scanning has begun, and a "document found" text message when the scanned document has been identified by an associated computer system. Although not illustrated in FIGS. 1A-1D, the scanner 100 can be operably connected to an associated computer or other suitable processing device via a wireless connection (e.g., a Bluetooth), or a cable connection (e.g., a mini-USB cable connection).

In addition to the foregoing features, the scanner 100 can also include a microphone (not shown) that is enabled when the user depresses the operating button 104. With this feature, the user can record verbal notes with the scanner 100 by speaking into the microphone before, after, or while positioning the scan window 110 in view of text or other images.

In some embodiments, at times at which the scanner is enabled, such as subsequent to the button 104 being depressed, the scanner automatically determines whether the optical channel, the voice channel, or both are active. For example, in some embodiments, if the scanner is receiving consistently high-volume audio, the scanner determines that the audio channel is active, and records audio data received via the audio channel. In some embodiments, the scanner determines whether the optical sensor is receiving data corresponding to in-focus text that is moving through the field of view, and, if so, determines that the visual channel is active, and records image data received via the visual channel.

Referring next to FIG. 1C, a capacity indicator 114 on the bottom surface of the scanner 100 can provide a visual indication of how much life remains in the scanner battery(ies). In addition, the bottom surface of the scanner 100 can also include a memory low indicator (not shown) that illuminates when storage capacity becomes low, or reads "memory full" when there is no more storage space available. Moving a hold switch 112 to an "off" position disables the scanner 100 and prevents inadvertently depressing the button 104 and turning the scanner 100 on during, e.g., transportation in the user's pocket.

Although various features of the scanner 100 have been described above for purposes of illustration and completeness, the various configurations and features disclosed herein are not limited to this particular scanner configuration. Indeed, many, if not all, of the inventive features described below can be incorporated into a wide variety of scanning devices, as will be clear to those of ordinary skill in the art.

Figure 2:
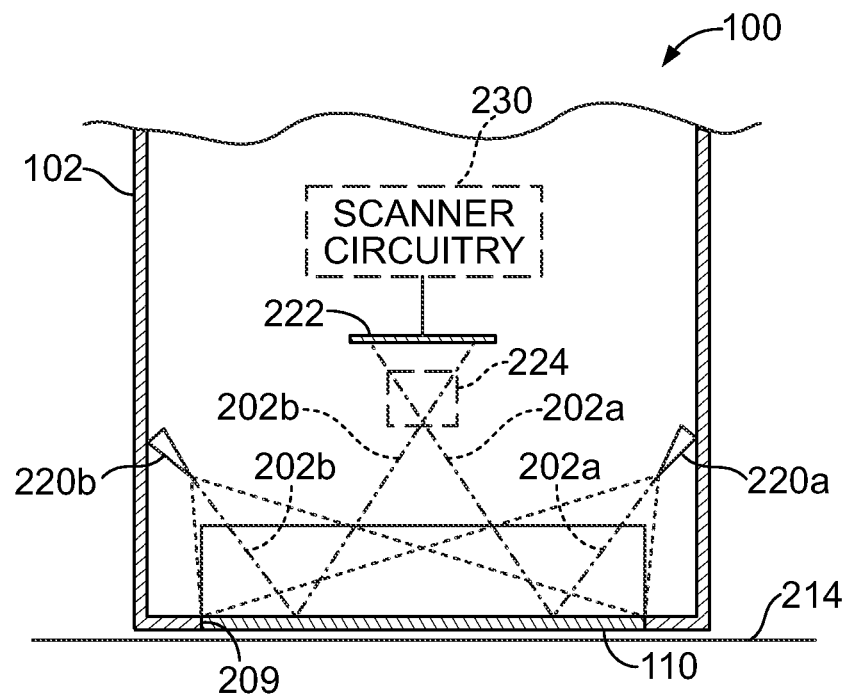
FIG. 2 is a cross-sectional top view of a portion of the optical scanner of FIG. 1, illustrating a scan window and other features of the optical scanner.

FIG. 2 is a cross-sectional top view of the scanner 100 taken substantially along line 2-2 in FIG. 1D. In one aspect of this embodiment, the scanner 100 can include one or more light sources 220 (identified individually as a first light source 220a and a second light source 220b) positioned within the body 102. The light sources 220 can include various types of lights including, for example, light emitting diodes (LEDs), incandescent lights, fluorescent lights, etc. During operation of the scanner 100, light from the sources 220 passes through the scan window 110 to illuminate text, images, and/or other markings (not shown) in a scan region on a page or other document 214. In the illustrated embodiment, an optical system 224 (shown schematically) directs image light from the illuminated scan region to an image sensor 222. Although not shown in detail, the optical system 224 can include one or more lenses to focus the image light on the sensor 222.

The image sensor 222 can include a coupled-charge device (CCD), a complementary metal oxide semiconductor (CMOS) device, a contact image sensor (CIS) device, and/or other suitable image sensing devices known in the art. The image sensor 222 is operably connected to scanner circuitry 230 (shown schematically) for, e.g., amplification, noise filtering, and/or analog-to-digital conversion of signals passing from the image sensor 222 to a scanner CPU (not shown). Although not shown, the scanner CPU can be operably connected to memory, one or more display devices, and/or one or more input/output devices associated with the scanner 100.

Although the scan window 110 is positioned slightly above the document 214 in FIG. 2 for purposes of clarity, in practice the scanner 100 can have other positions relative to the surface of the document 214. For example, in one embodiment the scan window 110 can be positioned directly on the image surface. In other embodiments, the scan window 110 can be held further away from the image surface than depicted in FIG. 2.

As mentioned above, during operation of the scanner 100, light from the light sources 220 passes through the scan window 110 to illuminate the adjacent portion of the document 214. In some instances, however, at least a portion of the light from the sources 220 may be reflected by the scan window 110, causing glare which strikes the image sensor 222 and adversely affects the resulting image. By way of example, this specular reflection can be illustrated by a first light ray 202a emitted from the first light source 220a, and a second light ray 202b emitted from the second light source 220b. Various approaches for minimizing or at least reducing this specular reflection and its adverse effects are described in more detail below with reference to FIGS. 3-6.

Figure 3:
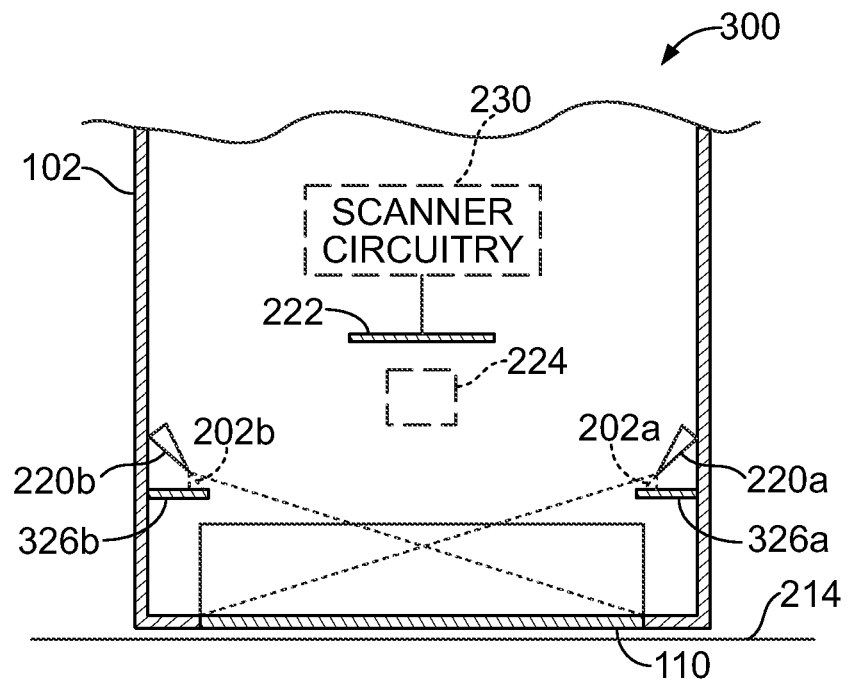
FIG. 3 is a cross-sectional top view of a portion of an optical scanner configuration having internal light shields for minimizing or reducing specular reflection.

FIG. 3 is a cross-sectional top view of a portion of a scanner 300 that is at least generally similar in structure and function to this scanner 100 described above with reference to FIGS. 1A-2. In one aspect of this particular embodiment, however, the scanner 300 includes a first light shield 326a and a second light shield 326b positioned within the scanner body 102. Each of the light shields 326 is positioned to block the portion of light from the corresponding light source 220 that would otherwise reflect off the scan window 110 and adversely affect the resulting scan image. For example, in the illustrated embodiment, the first light shield 326a extends inwardly from the scanner body 102 to block the first light ray 202a from reaching the scan window 110. Similarly, the second light shield 326b extends inwardly from an opposing side of the scanner body 102 to block the second light ray 202b from striking the scan window 110. As a result, little or no specular reflection from the scan window 110 reaches the image sensor 222 to obscure the resulting scan image. Furthermore, although the light shields 326 block a portion of the light from the light sources 220, the light sources 220 together still provide enough illumination for a suitable scan of the document 214.

Although one arrangement of the light sources 220 and the light shields 326 is shown in FIG. 3 for illustrative purposes, various other arrangements of light sources and light shields can be used without departing from the scope of the present disclosure. For example, in other embodiments, a single light shield can be used to block specular reflection from two or more light sources. In some embodiments, light shields can be attached to one or both of the front or bath walls of the scanner body 102, instead of the side wall as shown if FIG. 3. In such embodiments, the light shield can extend in front of the light source to block the rays causing the specular reflection, while still allowing light to pass on either side of the light shield and illuminate the scan region. In some embodiments, opaque cylindrical sleeves surrounding all or a portion of the light source not facing the scan window are used as light shields. In some embodiments, light emitting diodes or other light sources manufactured to emit light only at the end of their structure facing the scan window are used to create a similar effect.

Figure 4A:
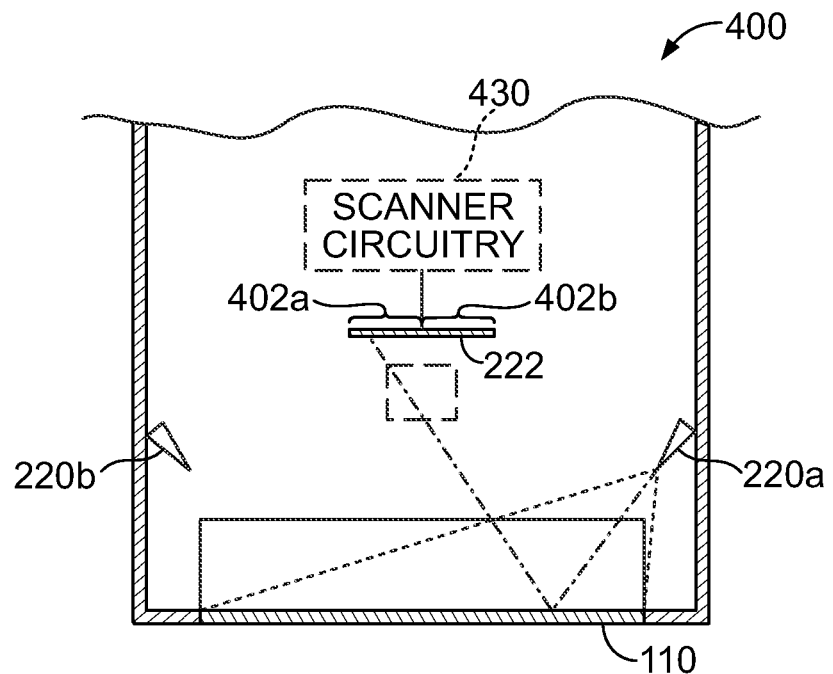
FIGS. 4A and 4B are cross-sectional top views of a portion of an optical scanner illustrating various stages in a method of sequential lighting.
Figure 4B:
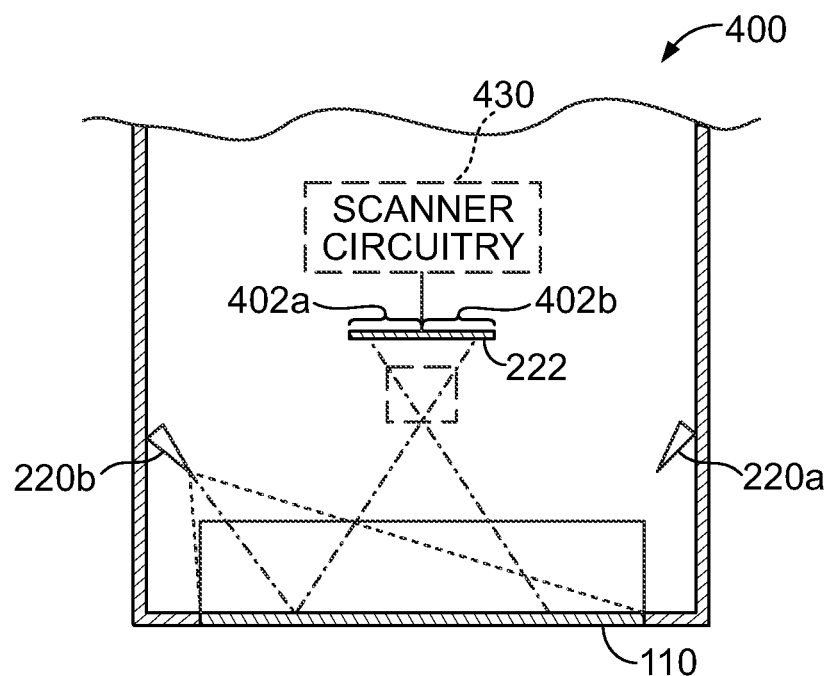

FIGS. 4A and 4B are cross-sectional top views of a portion of a hand-held optical scanner 400. Many features of the scanner 400 are at least generally similar in structure and function to corresponding features of the scanner 100 described above with reference to FIGS. 1A-2. For example, the scanner 400 can include the light sources 220 for illuminating the scan region, the image sensor 222 for capturing the illuminated image, and scanner circuitry 430 for processing information from the image sensor 222.

In one aspect of this particular embodiment, however, the individual light sources 220 are operatively connected to a controller (not shown), and are sequentially cycled off and on in relatively short time intervals during operation of the scanner 400. More specifically, when the first light source 220a is cycled on as shown in FIG. 4A, the second light source 220b is cycled off. Conversely, when the first light source 220a is cycled off as shown in FIG. 4B, the second light source 220b is cycled on. When the first light source 220a is on, it can cause specular reflection that adversely affects the scan image on a first sensor region 402a. Conversely, when the second light source is on, it can cause specular reflection that adversely affects the scan image on a second sensor region 402b.

To minimize or reduce any adverse affects from the specular reflection described above, the scanner circuitry 430 is configured to only record a portion of the scan image received by the image sensor 222 at any given time. More specifically, when the first light source 220a is on and possibly causing specular reflection in the first sensor region 402a, then the scanner circuitry 430 only records the portion of the scan image corresponding to the second sensor region 402b. Similarly, when the second light source 220b is on and possibly causing specular reflection in the second sensor region 402b, then the scanner circuitry 430 only records the portion of the scan image corresponding to the first sensor region 402a. The recorded scan image portions are then assembled or "stitched" together by the scanner circuitry 430 to form a complete and unobscured scan image, as described in more detail below with reference to FIGS. 4C and 4D.

Figure 4C:
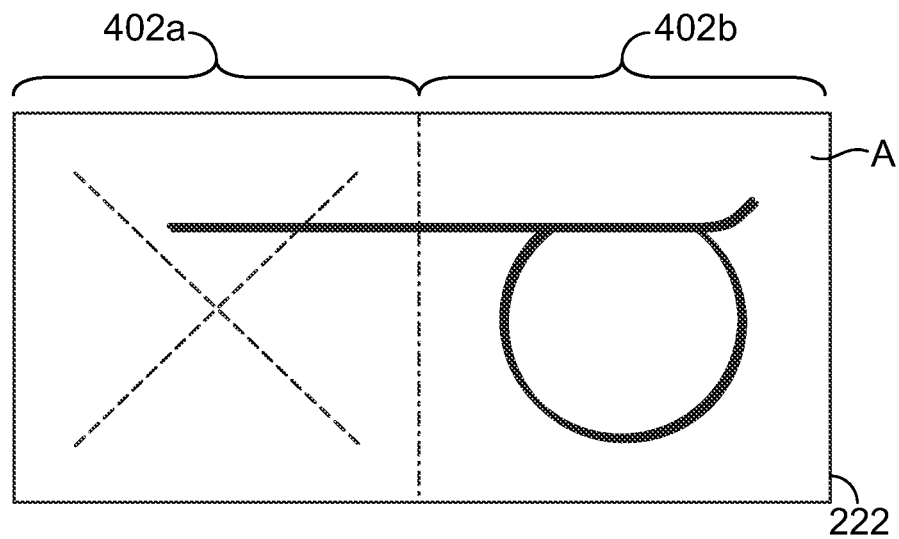
FIGS. 4C and 4D are schematic diagrams illustrating various stages in a related method of image processing.
Figure 4D:
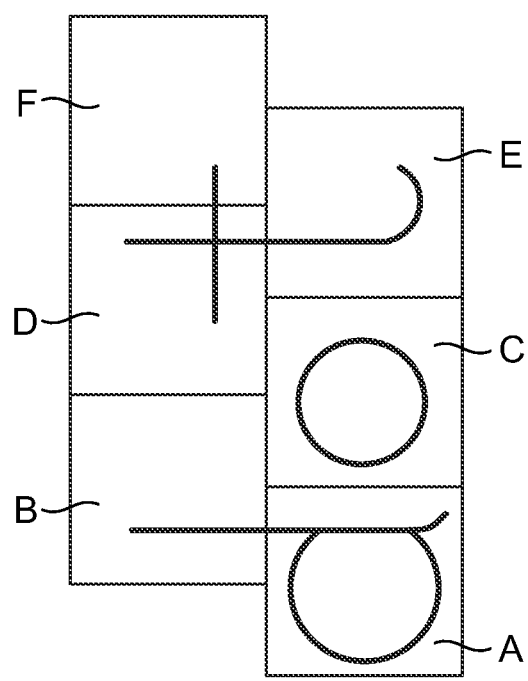

FIG. 4C illustrates a scan image of the letter "d" captured by the image sensor 222 when the first light source 220a is on and the second light source 220b is off, as shown in FIG. 4k As shown in FIG. 4C, the first light source 220a may produce some glare (represented by the "X") that obscures a portion of the scan image in the first sensor region 402a. At this time, the scanner circuitry 430 (FIGS. 4A and 4B) only records the portion of the scan image in the second sensor region 402b. For ease of reference, this recorded image portion is referred to herein as frame A. A fraction of a second later, the first light source 220a is turned off and the second light source is turned on. At that time, the scanner circuitry 430 only records the portion of the scan image in the first sensor region 402a. This results in frame B as shown in FIG. 4D which the scanner circuitry 430 orients to frame A to form the complete letter "d." The foregoing process repeats as the scanner 400 moves across the page or other object it is scanning, thereby assembling an accurate representation of the scanned subject matter.

Figure 5:
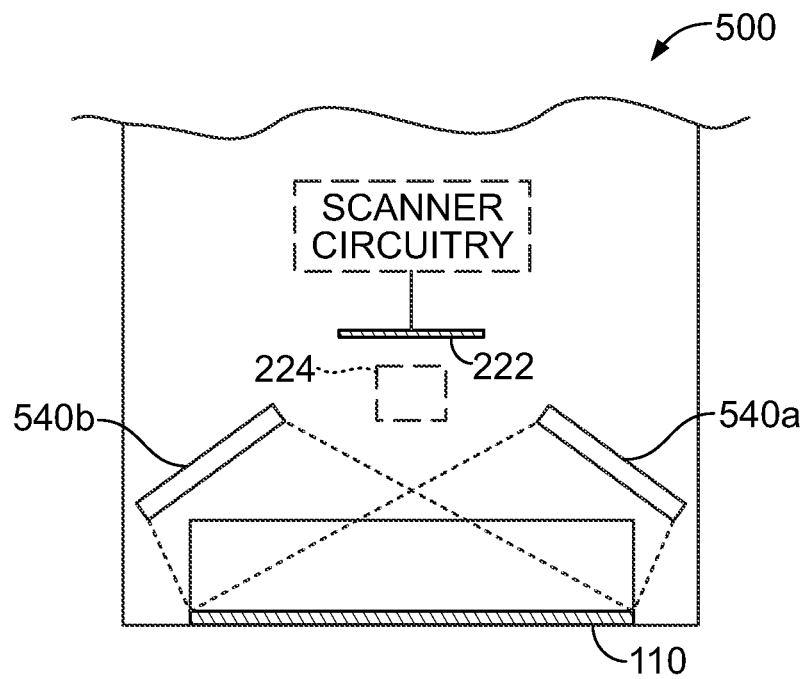
FIG. 5 is a cross-sectional top view of a portion of an optical scanner configuration that utilizes one or more diffused light sources.

FIG. 5 is a cross-sectional top view of a portion of a handheld optical scanner 500. Many features of the scanner 500 are at least generally similar in structure and function to corresponding features of the scanner 100 described above with reference to FIGS. 1A-2. For example, the scanner 500 includes the scan window 110, the optical system 224, and the image sensor 222. In one aspect of this particular embodiment, however, the scanner 500 can include one or more diffuse light sources 540 (identified individually as a first diffuse light source 540a and a second diffuse light source 540b) for illuminating the scan region (not shown). The diffuse light sources 540 can be various types of light sources including, for example, fluorescent light sources. In other embodiments, the diffuse light sources 540 can be incandescent and/or LED light sources that utilize a suitable diffusing element to diffuse the light. One advantage of using diffuse light sources is that the diffuse light may produce little or no specular reflection off the scan window 110, thereby providing an unobscured view to the image sensor 222.

Figure 6:
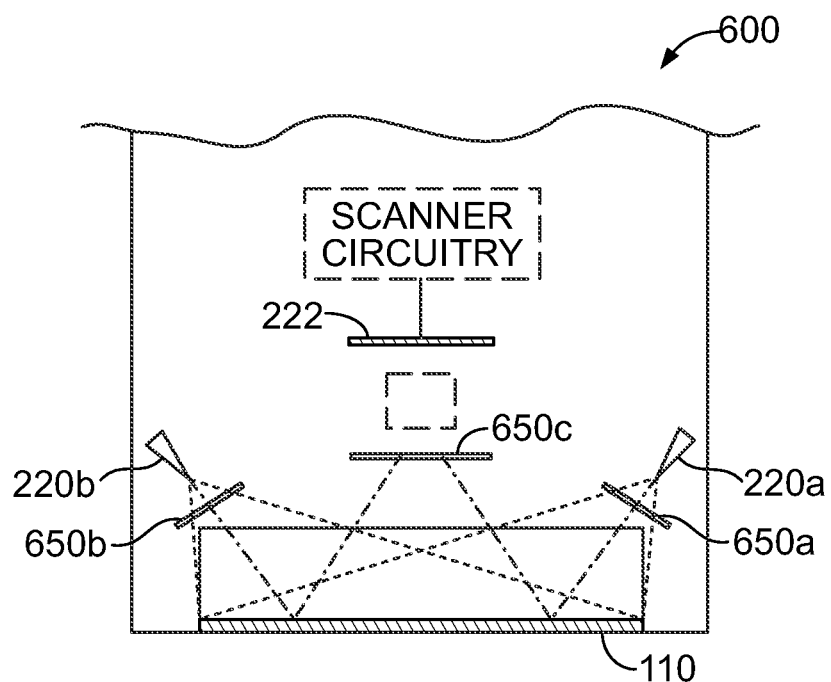
FIG. 6 is a cross-sectional top view of a portion of an optical scanner configuration that utilizes one or more light polarizing filters.

FIG. 6 is a cross-sectional top view of a portion of an optical scanner 600. Many features of the scanner 600 are at least generally similar in structure and function to corresponding features of the scanner 100 described above with reference to FIGS. 1A-2. In this particular embodiment, however, the scanner 600 can include one or more polarizing filters 650 (identified individually as a first polarizing filter 650a, a second polarizing filter 650b, and a third polarizing filter 650c) to reduce or eliminate any specular reflection from the light sources 220 off the scan window 110. For example, in the illustrated embodiment, the first polarizing filter 650a is positioned in front of the first light source 220a to polarize the light emitted from the first light source 220a. If, however, the first polarizing filter 650a is insufficient to eliminate the specular reflection caused by the first light source 220a, then the third polarizing filter 650c can be placed in front of the image sensor 222 to filter out any remaining glare.

In one embodiment, the first polarizing filter 650a can be configured to polarize the light emitted by the first light source 220a along a first axis (not shown), and the third polarizing filter 650c can be configured to cross-polarize the light entering the image sensor 222 along a second axis that is at least approximately perpendicular to the first axis. In other embodiments, other types of polarizing filters and other filter arrangements can be used to reduce or eliminate glare from the light sources 220. In one other embodiment, for example, a single polarizing filter in the position of the third polarizing filter 650c may be sufficient to reduce or minimize any adverse specular reflection off the scan window 110.

Figure 7A:
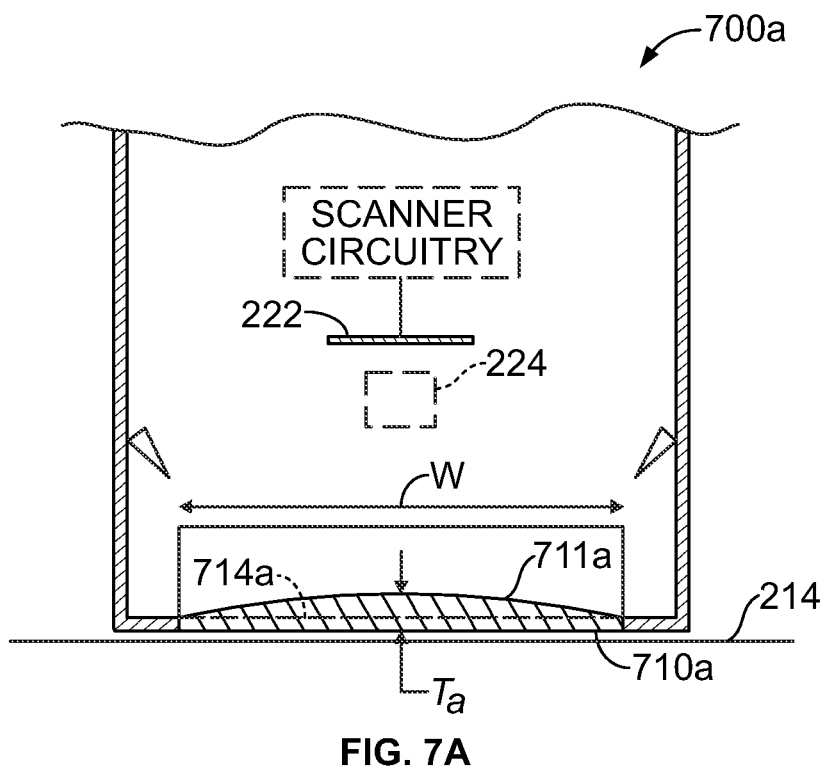
FIGS. 7A and 7B are cross-sectional top views of optical scanner configurations having scan windows with varying cross-sectional thicknesses.
Figure 7B:
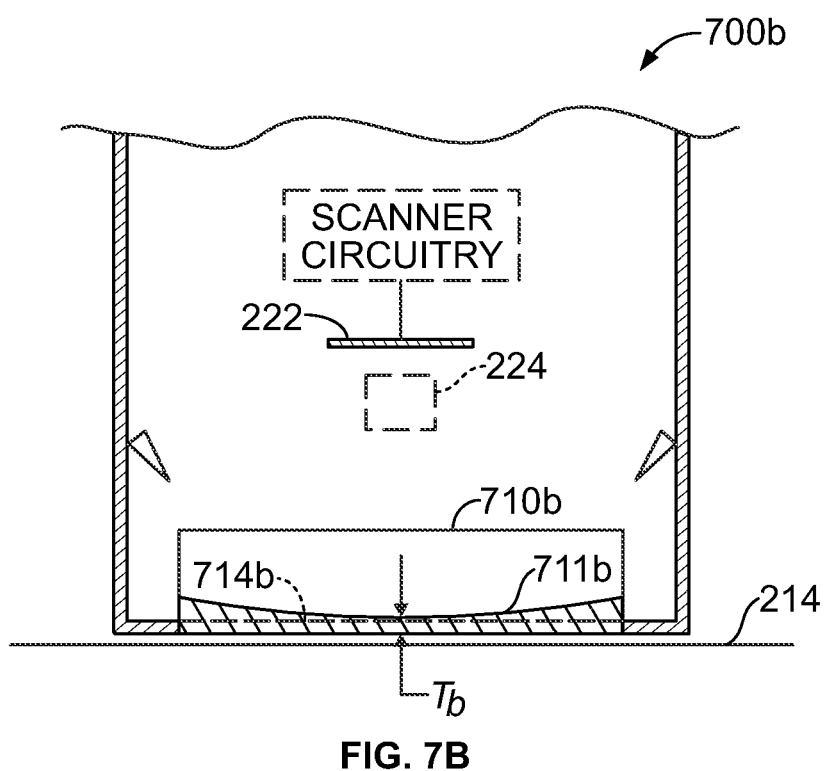

FIGS. 7A and 7B are cross-sectional top views of handheld optical scanners 700a and 700b, respectively. In one aspect of these embodiments, each of the scanners 700 includes a scan window 710 that is shaped in one more dimensions to produce desirable scan image characteristics. The scan window 710a of FIG. 7A, for example, has a convex inner surface 711a which results in a cross-sectional thickness Ta that increases toward a mid-portion of the scan window 710a and decreases toward the outer ends. This convex shape is illustrated by comparing the inner surface 711a to a constant thickness reference line 714a. Shaping the inner surface 711a as shown in FIG. 7A can have the effect of enlarging or magnifying the scanned image in the W direction, thereby reducing the field of view in this direction. Such magnification may be desirable, for example, to increase the level of detail available for character recognition.

In contrast to the scan window 710a, the scan window 710b of FIG. 7B has a concave inner surface 711b. As a result, the scan window 710b has a cross-sectional thickness Tb that decreases toward a mid-portion of the scan window and increases toward the outer ends. This concavity is illustrated by comparing the inner surface 711b to a constant thickness reference line 714b. Shaping the inner surface 711b in this manner can have the effect of reducing the size of the scan image in the W direction, thereby increasing the field of view in this direction. Increasing the field of view may be desirable, for example, to increase the amount of text imaged in a single pass of the scanner, or to reduce the depth or aperture of the optical system 224.

Figure 8A:
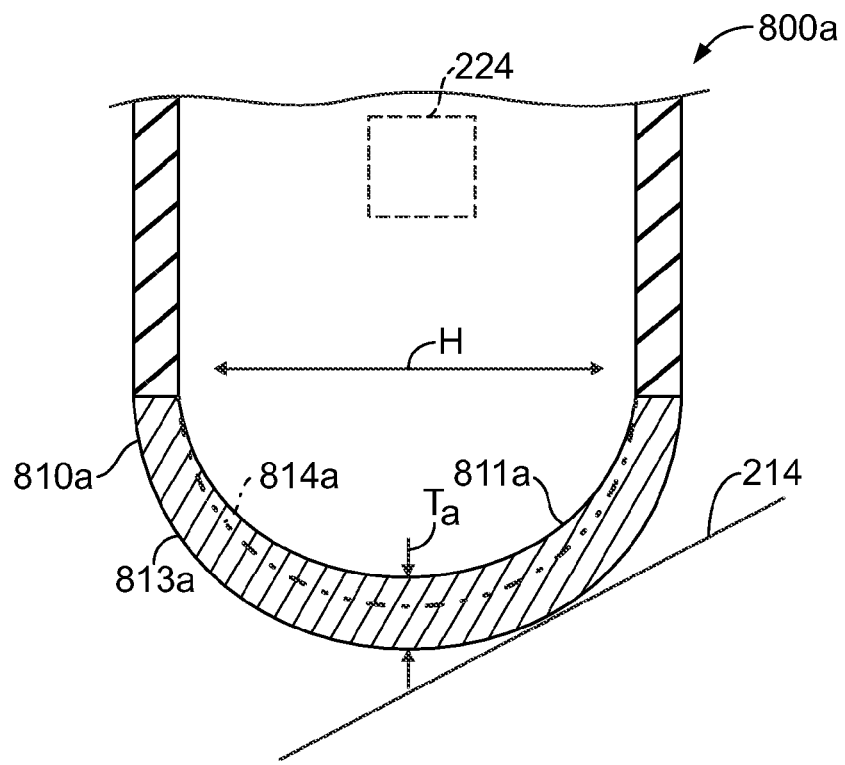
FIGS. 8A-8B are cross-sectional side views of optical scanner configurations having scan windows with varying cross-sectional thicknesses.
Figure 8B:
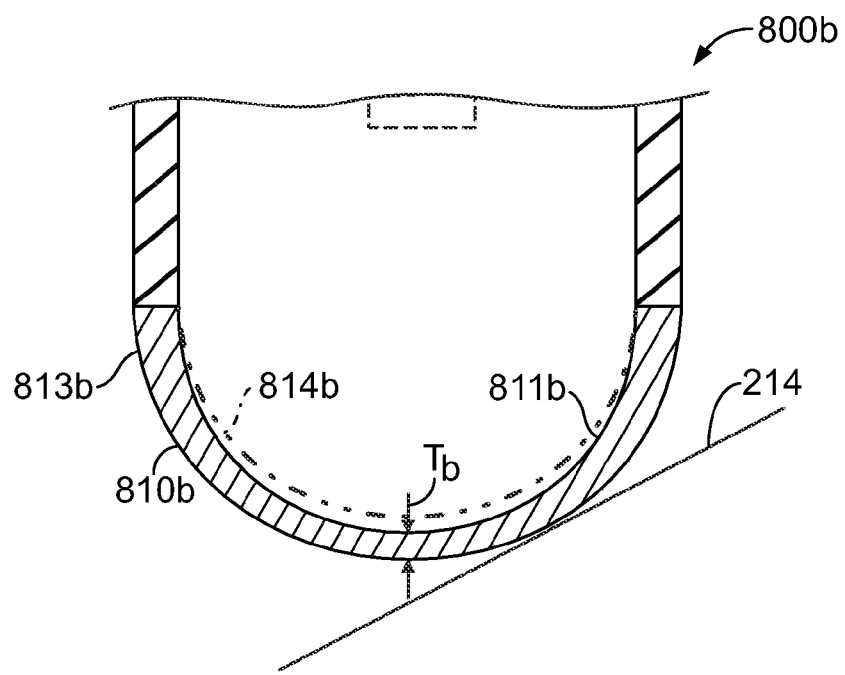

FIGS. 8A and 8B are cross-sectional side views of handheld optical scanners 800a and 800b, respectively, taken at a location indicated by line 8-8 in FIG. 1A. In FIGS. 8A and 8B, the scanners 800 are shown at an incline to the document 214 to illustrate one possible orientation during use. Use of the scanners 800, however, is not limited to this particular orientation. Indeed, the scanners 800 can be used in many other orientations including, for example, an orientation that is more perpendicular to the page 214.

As shown in FIG. 8A, the scanner 800a includes a scan window 810a having an inner surface 811a and an outer surface 813a. In this particular embodiment, the outer surface 813a is at least approximately cylindrical, and the inner surface 811a moves gradually inward and away from a constant-thickness reference line 814a toward a mid-portion of the scan window 810a. This shape results in a cross-sectional thickness Ta that increases toward the mid-portion of the scan window 810a. One effect of varying the scan window thickness as illustrated in FIG. 8A can be to magnify the scan image focused on the image sensor 222 (not shown in FIG. 8A) in a height direction H. Such magnification or enlargement may be desirable to improve character recognition and/or resolution parameters.

In one embodiment, the cross-section of the scan window 810a illustrated in FIG. 8A can be constant over the entire length of the scan window in the W direction (see FIG. 7A). In other embodiments, the cross-section of the scan window 810a can vary over its length in the W direction. For example, in one embodiment, the cross-section of the scan window 810a can vary over its length in the W direction in the manner illustrated by the scan window 710a of FIG. 7A.

In contrast to the scan window 810a of FIG. 8A, the scan window 810b of FIG. 8B has an inner surface 811b that moves outwardly and away from a constant-thickness reference line

814b toward a mid-portion of the scan window. This increases the concavity of the inner surface 811b relative to an outer surface 813b, and results in a cross-sectional thickness Tb that decreases toward the mid-portion of the scan window 810b. One effect of varying the cross-sectional thickness of the scan window 810b as shown in FIG. 8B can be to reduce the size of the scan image in the H direction. Such reduction may be advantageous if increasing the field of view in the H direction is desired.

In one embodiment, the scan window cross-section illustrated in FIG. 8B can remain constant over the entire length of the scan window and the W direction. In another embodiment, the cross-section of the scan window 810b can vary over its length in the manner illustrated by the scan window 710b of FIG. 7B.

Although various scan window shapes and surface contours have been discussed above with reference to FIGS. 7A-8B, other embodiments can include scan windows having other shapes and/or other surface contours. For example, other scan windows configured in accordance with the present disclosure can include combinations of the cross-sectional variations discussed above with reference to FIGS. 7A-8B. In yet other embodiments, the different thickness variations discussed above can be achieved by contouring the outer surface of the scan window, as opposed to the inner surface. In still further embodiments, the cross-sectional thickness of the scan window can be varied by contouring both the inner and outer surfaces to achieve favorable image magnification or reduction characteristics. Furthermore, the various scanner configurations disclosed herein are not limited to cylindrical, or generally cylindrical, scan windows, but instead can include other scan windows including, for example, flat windows, round windows, conical windows, parabolic windows, etc. Accordingly, those of ordinary skill in the art will appreciate that the various scanner features disclosed herein are not limited to use with the particular scan window configurations discussed above.

Figure 9:
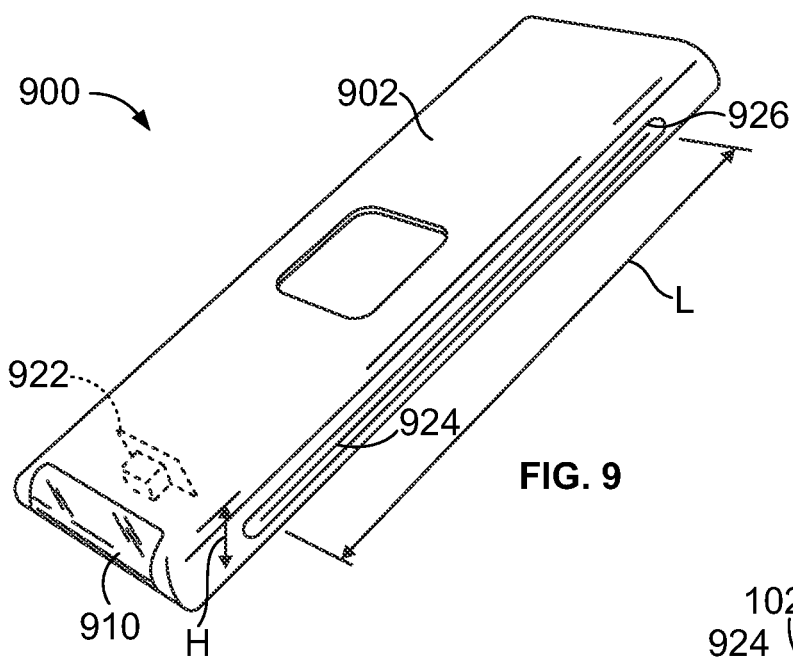
FIG. 9 is an isometric view of a hand-held optical scanner configuration having a first image sensor proximate a first facet and a second image sensor proximate a second facet.

FIG. 9 is an isometric view of a hand-held optical scanner 900. Many features of the scanner 900 can be at least generally similar in structure and function to corresponding features of the scanners described above with reference to FIGS. 1A-8B. For example, the scanner 900 includes a first image sensor 922 positioned toward one end of a body 902 that is at least generally similar in structure and function to the image sensor 222 described above with reference to FIG. 2. In this regard, the scanner 900 also includes a scan window 910 that is at least generally similar in structure and function to one or more of the scan windows 110, 710 or 810 described above.

In one aspect of this particular embodiment, however, the scanner 900 further includes a second image sensor 924 positioned toward one side of the body 902. The body 902 includes an aperture 926 through which the second image sensor 924 can scan images. In one embodiment, the aperture 926 can be covered by a transparent or translucent window or a lens. In another embodiment, the aperture 924 can remain open and the image sensor 924 can be inset slightly from the aperture. In still further embodiments, the second image sensor 924 can be positioned at least generally flush with the side surface of the body 902 so that the second image sensor 924 is in contact (or near contact) with the surface of the document or other object it is scanning.

In one embodiment, the first image sensor 922 can be a two-dimensional (2D) image sensor for scanning text or other images in the manner described above with reference to FIGS. 1A-1D, and the second image sensor 924 can be a one-dimensional (1D) image sensor having a length L for scanning or copying broader portions of text or other images in a relatively fast manner. As used herein, the term 1D image sensor is used to refer to an image sensor having a generally linear array of sensing elements (e.g., pixels), although it will be understood by those of skill in the art that such a sensor will likely include a plurality of sensing elements (e.g., two or three rows of sensing elements) in the height direction H.

Figure 10:
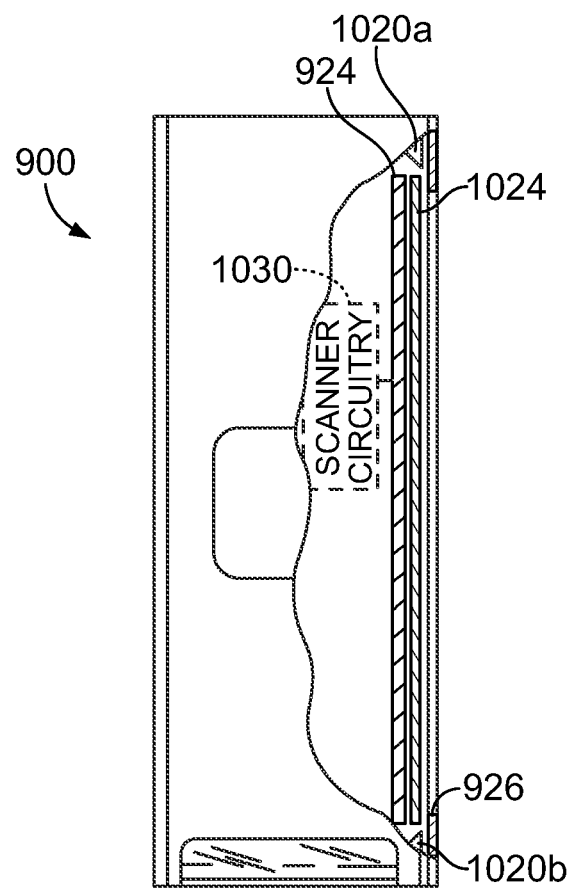
FIG. 10 is a partially cut-away, cross-sectional top view taken through a side portion of the optical scanner of FIG. 9, illustrating various features associated with the second image sensor.

FIG. 10 is a partially cut away, cross-sectional top view of the hand-held optical scanner 900 of FIG. 9. In this embodiment, the second image sensor 924 is inset slightly from the body aperture 926. In addition, an optical system 1024 comprising one or more of lenses can be positioned in front of the second image sensor 924 to focus the scanned image on the sensor. In other embodiments, a contact image sensor (CIS) may be used to focus the image of the illuminated scan region onto the surface of the image sensor 924. Although not shown in detail in FIG. 10, the scanner 900 can include an arrangement of one or more light sources 1020 to illuminate the scan region. Like the scanner 100 described above with reference to FIG. 2, the second image sensor 924 is operably connected to suitable scanner circuitry 1030 for processing the data signals from the image sensor 924 before transmission to the scanner CPU (not shown).

Although the second image sensor 924 is offset from the aperture 926 in the embodiment of FIG. 10, as discussed above with reference to FIG. 9, in other embodiments, the second image sensor 924 can be positioned closer to the aperture 926 so that it is in contact, or near-contact, with the surface of the document or other object being scanned.

The second image sensor 924 can be used to capture relatively large areas of text, images, or other markings in a single scanner pass. For example, this sensor can be employed when the user desires to scan a particular paragraph or larger section of text and identify the corresponding document (or version of the document) and/or the particular page. In contrast, the user may elect to use the first image sensor 922 when the user wishes to capture all or a portion of a particular sentence or other relatively small marking.

Figure 11A:
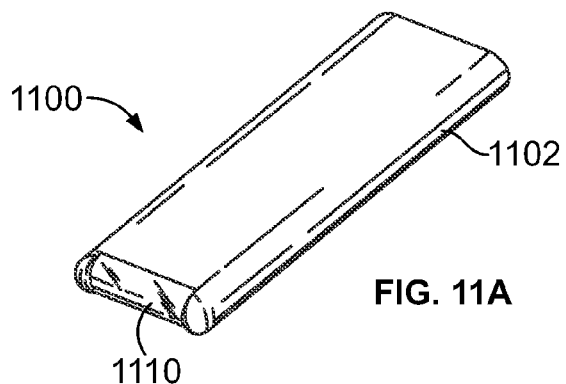
FIGS. 11A-11C are isometric, end, and cross-sectional side views, respectively, of another configuration of a hand-held optical scanner.
Figure 11B:
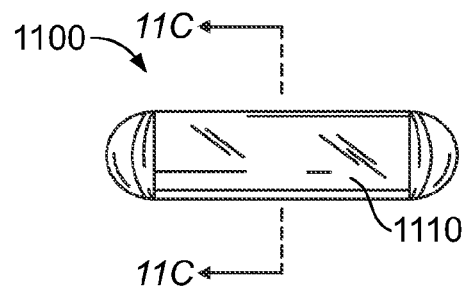
Figure 11C:
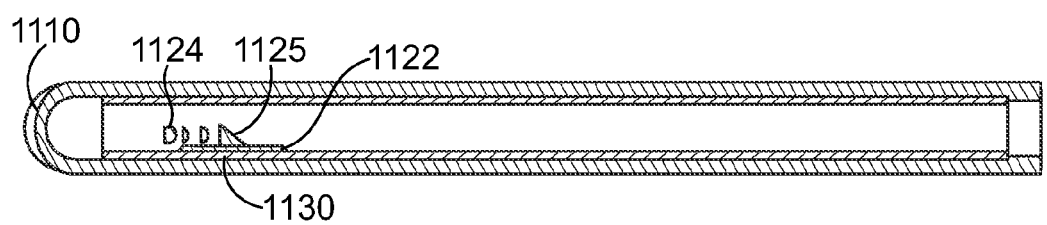

FIGS. 11A-11C are isometric, end, and cross-sectional side views, respectively, of a hand-held optical scanner 1100. Referring first to FIG. 11A, the scanner 1100 includes a scan window 1110 positioned toward an end portion of a body 1102. Many features of the scanner 1100 can be at least generally similar in structure and function to corresponding features of the various hand-held optical scanners described above with reference to FIGS. 1A-10.

FIG. 11C is a cross-sectional side view taken substantially along line C-C in FIG. 11B. In the illustrated configuration, the scan window 1110 can include a curved lens (e.g., a curved clear lens) that is inset slightly from the end of the scanner body 1102. In other configurations, however, the scan window can include other suitably transparent or translucent materials in other positions relative to the scanner body 1102. In one aspect of this particular configuration, the scanner 1100 includes a light turning or folding element 1125 (e.g., a light folding prism) which directs the image light from an optical system 1124 onto an image sensor 1122. The optical system 1124 can include an array of one or more lenses to suitably focus the image light onto the light folding element 1125. In another aspect of this configuration, the image sensor 1122 is oriented at an angle (e.g., a right angle or at least approximately 90 degrees) relative to the image light. The image sensor 1122 can be operatively connected to image circuitry 1130 for amplification, A/D conversion, and/or other processing of the signals from the image sensor 1122. In this regard, the scanner circuitry 1130 can include a printed circuit board assembly and/or other electrical/processing systems.

Figure 12:
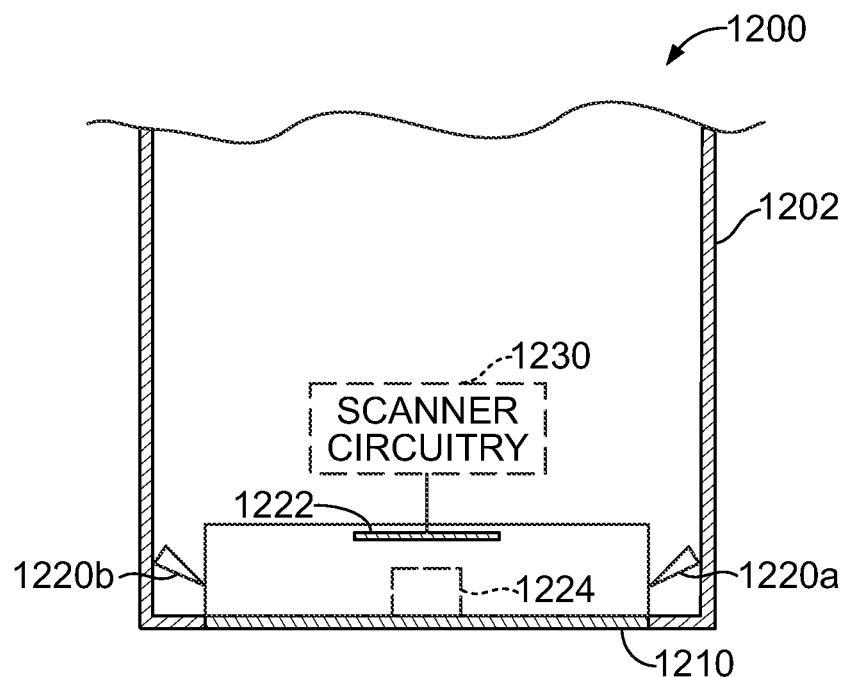
FIG. 12 is a cross-sectional top view of a portion of an optical scanner having a scan window and other features arranged in another configuration.

FIG. 12 is a cross-sectional top view of a scanner 1200 which is at least generally similar in structure and function to the scanner 200 described above with reference to FIG. 2. For example, the scanner 1200 includes a transparent or translucent scan window 1210 positioned toward one end of a scanner body 1202. A plurality of light sources 1220 (identified individually as a first light source 1220a and a second light source 1220b) illuminate a region in front of the scan window 1210 during operation of the scanner 1200. An optical system 1224 (shown schematically) directs image light from the illuminated scan region to an image sensor 1222. The scan window 1210, the optical system 1224, the image sensor 1222 and associated scanner circuitry 1230 can be at least generally similar in structure and function to corresponding features of the scanner 200 described above.

The scanner configuration illustrated in FIG. 12 differs from that shown in FIG. 2 in that there is little or no space between the optical system 1224 and the scan window 1210. For example, in one configuration, the optical system 1224 can contact, or be in near contact with, the scan window 1210 as illustrated in FIG. 12. In this configuration, the optical system 1224 (or image sensor 1222) can be positioned from about 0.0 inch to about 0.1 inch away from the inner surface of the scan window 1210. In another configuration, the optical system 1224 (and/or image sensor 1222) can be positioned from about 0.0 inch to about 0.25 inch away from the inner surface of the scan window 1210. In other configurations, the optical system 1224 (and/or the image sensor 1222 and associated scanner circuitry 1230) can be inset from the scan window 1210, but not as far inset as the optical system 224 illustrated in FIG. 2.

When the optical system 1224 and the image sensor 1222 move closer to the scan window 1210 as shown in FIG. 12, the light sources 1220 can be suitably located in various positions to provide ample illumination of the scan region. For example, in one configuration the light sources 1220 can be positioned relatively close the scan window 1220 as illustrated in FIG. 12. In other configurations, the light sources 1210 (or a single light source 1220) can be positioned in more inboard, or in more remote, locations than illustrated in FIG. 12.

FIGS. 13A and 13B are schematic diagrams of successive scan images of a letter "B" captured by the image sensor 222 as the associated scanner (not shown) moves across a document (also not shown) in direction F. In this example, the cross-hatched regions 1302a and 1302b represent portions of the scan image that are obscured or otherwise adversely affected by glare from specular reflection. In the position of FIG. 13A, the scanner circuitry records a first portion 1 and a second portion 2 of the first scan image. Shortly thereafter, the scanner moves to the position of FIG. 13B and the scanner circuitry records a third portion 3 and a fourth portion 4 of the second scan image. As will be noted, the recorded portions of the scan images omit the regions 1302 which are adversely affected by specular reflection. Once the scanner circuitry has recorded the scan image portions 1-4 in the foregoing manner, the portions can be assembled or "stitched" together to form a complete and unobscured scanned image of the letter "B," as described in more detail below with reference to FIG. 14.

FIG. 14 is a schematic diagram of a composite image that the scanner circuitry has assembled from the scan image portions 1-4 discussed above. The first portion 1 and the second portion 2 of the image shown in FIG. 14 were recorded from the scan image of FIG. 13A. The third portion 3 and the fourth portion 4 of the image shown in FIG. 14 were recorded from the scan image of FIG. 13B. The foregoing process illustrates one method for recording a complete scan image using portions of captured images that may include regions obscured from glare.

Figure 15:
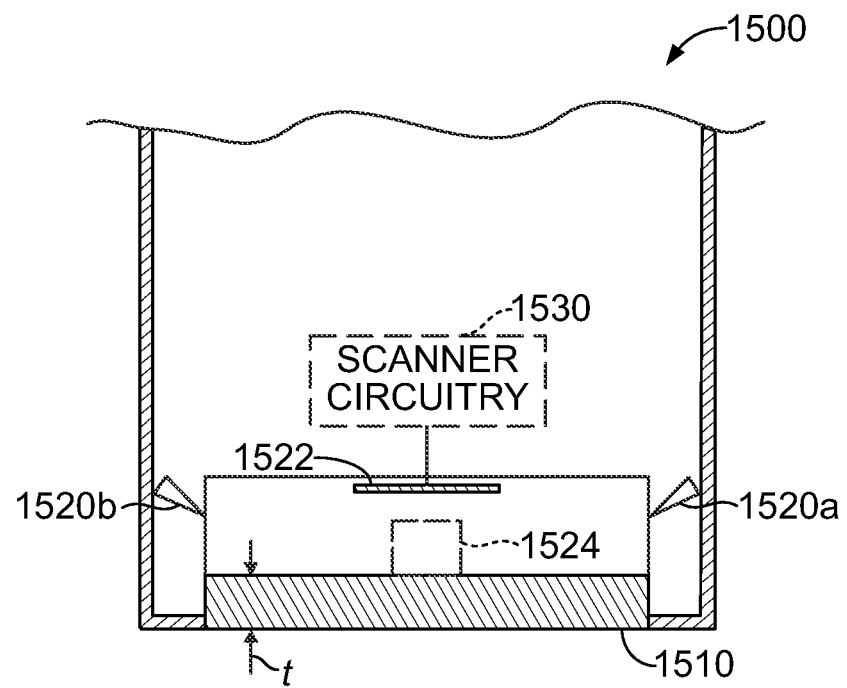
FIG. 15 is a cross-sectional top view of a portion of an optical scanner having a scan window and other features arranged in yet another configuration.

FIG. 15 is a cross-sectional top view of a scanner 1500 which is at least generally similar in structure and function to the scanner 200 described above with reference to FIG. 2. In this regard, the scanner 1500 includes a plurality of light sources 1520 (identified individually as a first light source 1520a and a second light source 1520b) which illuminate a region in front of a transparent or translucent scan window 1510 during operation of the scanner 1500. An optical system 1524 (shown schematically) directs image light from the illuminated scan region to an image sensor 1522.

In the illustrated configuration, the scan window 1510 has a thickness t which is relatively thick. For example, the thickness t can range from about 0.10 inch to about 1.5 inch. In another configuration, the thickness t can range from about 0.25 inch to about 1.25 inch; or from about 0.5 inch to about 1.0 inch. In a further configuration, the thickness t can range from about 0.75 inch to about 1.0 inch. In other configurations, the scan window 1510 can have other thicknesses depending on various factors such as optical quality, manufacturability, etc. In one aspect of this configuration, there is little or no space between the optical system 1524 and the inner surface of the scan window 1510. For example, in one configuration, the optical system 1524 can contact, or be in near contact with, the scan window 1510 as illustrated in FIG. 15.

From the foregoing, it will be appreciated that various embodiments of hand-held optical scanners and related features have been described herein for purposes of illustration, but that various modifications may be made without deviating from the spirit and scope of the present disclosure. Accordingly, the invention is not limited, except as by the appended claims.

What is claimed is:
1. A hand-held optical scanner, comprising:
a scan window;
a first light source and a second light source that are positioned within the handheld optical scanner, wherein the first light source and the second light source emit light for passing through the scan window to illuminate an adjacent document, the first light source illuminating a first portion of the document and the second light source illuminating a second portion of the document different from the first portion;
a controller operatively connected to the first light source and the second light source, wherein the controller is configured to cause the first light source and the second light source to cycle on and off in sequence such that no more than one of the first light source and the second light source is on at any time;
an image sensor that captures light that passes from the adjacent document into the hand-held optical scanner through the scan window and provides an electrical signal based on the captured light; and
scanner circuitry that is operatively connected to the image sensor, wherein the scanner circuitry is configured to:
selectively record a first portion of light captured by a first region of the image sensor when the first light source is on and the second light source is off and record a second portion of light captured by a second region of the image sensor when the second light source is on and the first light source is off, the first portion of light defining a first image of the first por- tion of the document and the second portion of light defining a second image of the second portion of the document; and combine the first and second images to form a complete image.

2. The hand-held optical scanner of claim 1, further comprising:

a light shield that is configured to block at least a portion of the emitted light from reaching the scan window.

3. The hand-held optical scanner of claim 1, wherein the first light source and the second light source each include a diffuse light source.

4. The hand-held optical scanner of claim 1, further comprising:

a first light polarizing filter through which at least a portion of the emitted light passes; and a second light polarizing filter through which at least a portion of the emitted light that is reflecting off the scan window passes, the first and second polarizing filters being rotationally aligned in a way that produces a cross-polarization effect.

5. The hand-held optical scanner of claim 1, wherein the scan window has an inner surface spaced apart from an outer surface to define a cross-sectional thickness of the scan window, and wherein the cross-sectional thickness of the scan window varies in a first direction.

6. The hand-held optical scanner of claim 1, wherein the scan window has an inner surface spaced apart from an outer surface to define a cross-sectional thickness of the scan window, and wherein the cross-sectional thickness of the scan window varies in a first direction and a second direction.

7. The hand-held optical scanner of claim 1, wherein the scan window is configured to magnify at least a portion of a scan image that is focused on the image sensor.

8. The hand-held optical scanner of claim 1, wherein the scan window is configured to reduce the size of at least a portion of a scan image that is focused on the image sensor.

9. The hand-held optical scanner of claim 1, wherein the scan window has a thickness of from about 0.50 inch to about 1.0 inch.

10. The hand-held optical scanner of claim 1, further comprising a single light polarizing filter through which at least a portion of the emitted light that is reflecting off the scan window passes.

11. The hand-held optical scanner of claim 1, wherein the scanning window comprises a translucent material.

12. The hand-held optical scanner of claim 1, wherein the scanning window comprises a transparent material.

13. The hand-held optical scanner of claim 1, further comprising a reflection-reducing component configured to reduce an amount of emitted light that reflects off of the scan window.

14. The hand-held optical scanner of claim 1, wherein the scan window comprises a convex shape.

15. The hand-held optical scanner of claim 1, wherein the scan window comprises a concave shape.

* * * * *